Nov. 22, 1955  C. J. RANDALL ET AL  2,724,676
METHOD OF MAKING HEAT INSULATED WATERPROOF FOOTWEAR
Filed Aug. 4, 1953  2 Sheets-Sheet 1
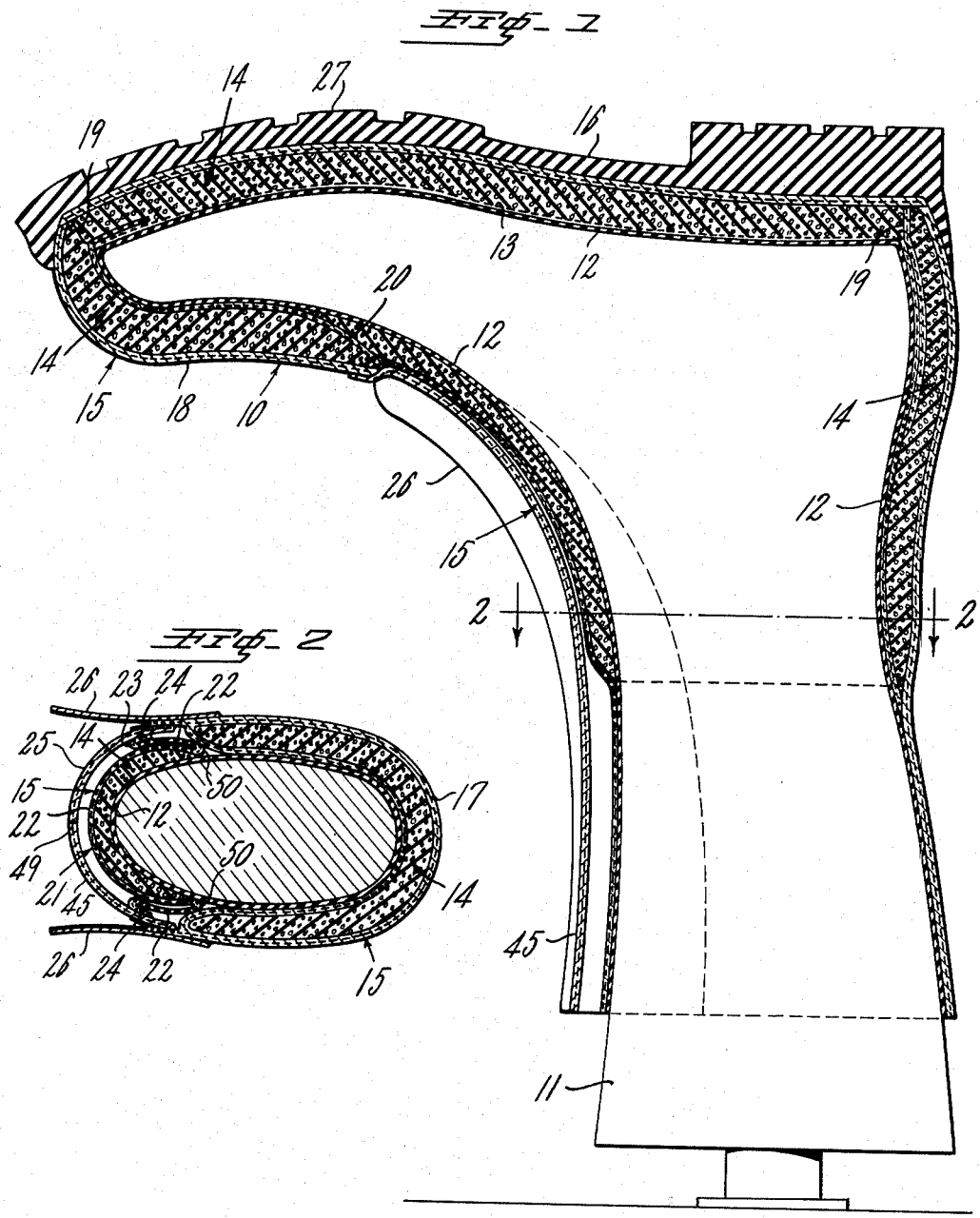
INVENTORS
CHESTER J. RANDALL
WILLIAM J. GRUNER
BY
William H. Epes
ATTORNEY

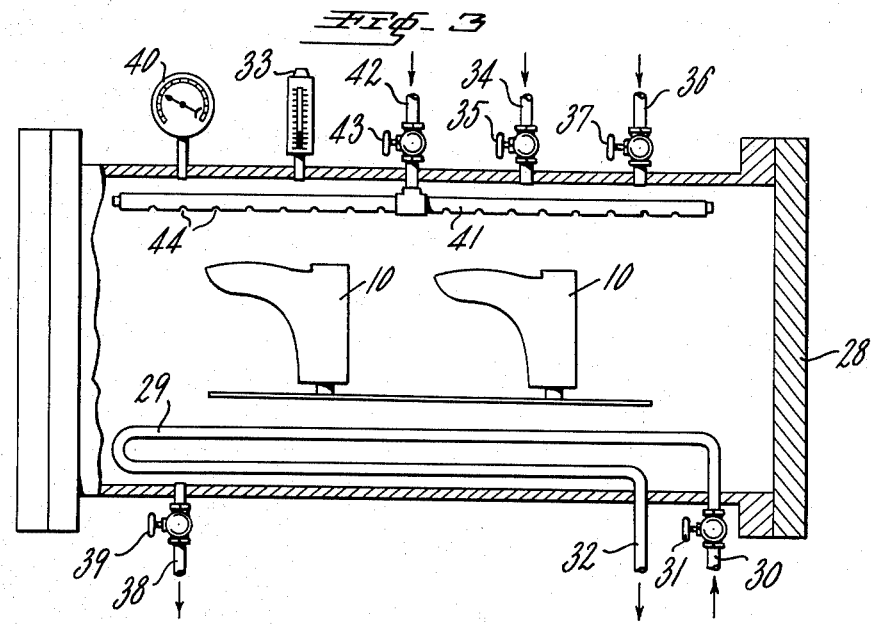
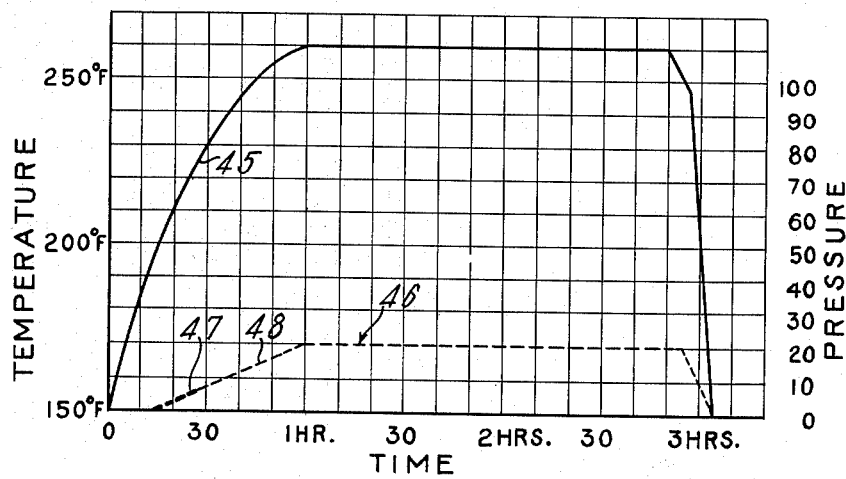

# United States Patent Office 2,724,676
Patented Nov. 22, 1955

2,724,676

METHOD OF MAKING HEAT INSULATED WATERPROOF FOOTWEAR

Chester J. Randall and William J. Gruner, Naugatuck, Conn., assignors to United States Rubber Company, New York, N. Y., a corporation of New Jersey Application August 4, 1953, Serial No. 372,276

6 Claims. (Cl. 154—139)

This invention relates to an improved method of making heat insulated waterproof footwear by building an insulating layer of pre-blown cellular rubber on a rigid last, and heat curing a protective waterproof outer shell of uncured rubber over the insulating layer, while the external pressure is balanced against the internal pressure of the insulating layer to maintain the insulating layer at a sufficiently constant volume to prevent it from being ruptured or distorting the outer shell as a result of its expansion.

Heretofore it has been proposed to make heat insulated waterproof footwear by building up layers of uncured cellular producing or partly cured and blown rubber compound, and uncured rubber compound without a blowing agent on a rigid last to form the cellular heat insulating lining and the dense protective shell, respectively, of the footwear. The layers of rubber were then cured in the usual manner. In accordance with this prior practice, the insulating layer expanded during the heat curing period and produced defective footwear because of the displacement or rupture of the layers thereof resulting from the expansion.

In accordance with the present invention the insulating layer of cellular rubber is preblown before it is applied to the rigid last. The protective layer of uncured rubber is then built up over the cellular layer and heat cured while the cellular layer is prevented from being expanded as a result of the heat by balancing the external or surface pressure on the outer layer with the internal pressure of the cellular layer during the curing cycle, as explained in detail in reference to the accompanying drawings, in which:

Fig. 1 is a vertical cross section from heel to toe of an insulated boot, which has been made in accordance with this invention, and is shown on a rigid conventional building last with its sole facing upwardly in the building position;

Fig. 2 is a transverse cross section on line 2—2 of Fig. 1 through the top of the boot;

Fig. 3 is a cross sectional view of an autoclave adapted to process the insulated boots shown therein in accordance with this invention; and Fig. 4 is a temperature, pressure, time chart, illustrating the method of operating upon the insulated boots shown in the autoclave in Fig. 3 to maintain a balance between the internal and external pressures on the boot.

The practice of this improved method of making waterproof insulated footwear is illustrated in the drawings in reference to the manufacture of a boot, which is provided with a bellows tongue. Referring to Figs. 1 and 2, the various parts of the boot 10 are built up on a conventional rigid last 11. The boot 10 is provided with a waterproof protective inner lining 12, which may be omitted if desired. The lining 12 is preferably made of uncured latex deposited rubber composition. In practice, the lining is made by dipping a form in a latex bath and depositing a coating of latex thereon in the shape of a sock. The deposit is dried on the dipping form and removed therefrom by turning it inside out. The turned sock is then placed on the last 11 to form the inner lining 12.

The other parts of the boots are cut in suitable shapes and built up over the lining 12 and adhered together with rubber cement coatings, or by the natural tack of such parts in the conventional manner of building footwear. Fabric reinforcements 13, as represented by the dotted lines, may be inserted in such areas, as may be required. Preblown soft flexible cellular rubber 14 is placed between the last 11, or inner lining 12, and an outer shell 15 of uncured rubber. The majority of the cells of the cellular material are preferably small individual or non-communicating cells, and such preferred cellular material is hereinafter referred to as closed cell cellular rubber. The cellular rubber 14 is placed in the sole portion 16, quarter portion 17, and toe portion 18 of the boot, so as to provide a completely insulated boot. The parts of the material 14 are united by cemented butt and lap joints 19 and 20.

The bellows tongue 21 is built up as a separate piece, and is united to the quarter by a piece of rubber coated fabric 22 which extends across the front of the tongue and is provided with doubled over margins, or folds 23, the outer edges of which are united at 24 through a bridging piece 25 to the quarter 17 on each side of the tongue. The cellular material 14 is encased between the lining 12, and a portion of the rubber coated fabric 22, which also forms a part of the outer shell 15. The eyelet stays 26 are then adhered to each side of the quarter 17. The one piece rubber sole and heel tread 27 being relatively thick, it is partly or completely cured and then applied in the usual manner, and is herein considered as a part of the outside shell of the boot. All of the rubber parts of the boot are applied in the uncured state, excepting the pre-blown closed cell cellular rubber 14, and these uncured rubber materials are preferably the conventional vulcanizable rubber compositions of the type for use in the manufacture of waterproof footwear.

After the boot 11 has been built up as hereinbefore described, it is placed in an autoclave 28, as shown in Fig. 3, for the purpose of curing the uncured layers of rubber in the boot, and forming a strong bond between the parts. The autoclave 28 is equipped with steam heating coils 29, which are supplied with steam through an inlet 30 controlled by a valve 31. The steam and condensate is exhausted through a pipe 32. It will be noted that the steam does not enter the autoclave 28, but is merely used for the purpose of supplying heat thereto, and other means of heating may be susbtituted therefor. The autoclave 23 is equipped with a temperature indicator 33 to measure the temperature of the atmosphere therein. Where the footwear is made of vulcanizable rubber compositions, ammonia gas is supplied to the autoclave 28 through a pipe 34 which is controlled by a valve 35 for the purpose of accelerating the vulcanization. Fluid pressure is produced within the autoclave 28, by the admission of the ammonia gas and also by the admission of air through a pipe 36 which is controlled by a valve 37. The intensity of the pressure is indicated in gauge pressure per square inch by a pressure indicator 40. The ammonia gas and the air is exhausted from the autoclave through a pipe 38 which is controlled by a valve 39. The autoclave 28 is also equipped with a cold water spray pipe 41, which is supplied with cold water through an inlet pipe 42, which is controlled by a valve 43. At the desired time the water is sprayed upon the boots 10 through the openings 44 in the pipe 41.

The manner in which the autoclave 28 is operated to heat cure the uncured rubber parts of the shoe is dependent upon the type of rubber composition used in the boot 10. As an illustrative example, the operation of the autoclave is hereinafter described in reference to the use of the following vulcanizable rubber compositions in the protective outer shell 15 and the inner lining 12:

*Rubber composition for shell 15*

| Ingredients | Parts by dry Weight |
|---|---|
| Smoked Sheet No. 1 | 90.50 |
| GR-S 1018 (butadiene styrene copolymer rubber) | 9.50 |
| SRF Black | 9.12 |
| Calcium Carbonate (water ground) | 41.70 |
| Vermont Talc | 5.50 |
| Zinc Oxide | 4.00 |
| Inhibitor of Static Atmospheric Cracking (wax blend) | .36 |
| Antioxident A: Diarylamine-ketone-aldehyde reaction product | .27 |
| Antioxidant B: Condensation product of acetone and aniline | .34 |
| Carried forward | 161.29 |
| Antioxidant C: Blend of phenyl beta naphthylamine, isopropxy diphenylamine and diphenyl-p-phenylenediamine | .34 |
| Retarder or Antiscorch phthalic anhydride | .27 |
| Accelerator A: MBTS (benzothiazyl disulphide) | .39 |
| Accelerator B: tetramethylthiuram monosulphide | .07 |
| Sulfur | 1.67 |
| Total | 164.03 |

*Rubber composition for inner lining 12*

| Ingredients | Parts by dry Weight |
|---|---|
| Creamed Latex (Total Solids 67%) | 100 |
| Potassium Hydroxide | 0.50 |
| Potassium Oleate | 0.20 |
| Dispersing Agent (Soap) | 0.70 |
| Antioxidant A (dialkyl phenol sulfide) | 1.31 |
| Antioxidant B (reactor product of acetone and phenyl betanaphthylamine) | 0.20 |
| Accelerator (mercapto benzothiazole) | 0.81 |
| Zinc Oxide | 3.20 |
| Sulfur | 1.07 |
| Total | 107.99 |

Where the above uncured layers of rubber compositions for the layers 12 and 15 are used in the boot 10, the autoclave 28 is operated as illustrated by the solid temperature-time curve 45 and the dotted pressure-time curve 46 shown in Fig. 4. Having reference to the temperature-time curve 45, the temperature in the autoclave 28 is raised to 150° F. at the time the boots 10 are placed therein, and the autoclave is then closed. During the first 15 minutes the temperature is gradually raised from 150° F. to about 190° F. without any substantial rise in pressure in the autoclave. At the end of the first 15 minutes ammonia gas under a pressure greater than 7½ p. s. i. is admitted through the pipe 34 for 12 minutes to raise the pressure within the autoclave as indicated by the heavy dotted line 47 to about 7½ p. s. i. at a temperature of 220° F. Air under a pressure greater than 20 p. s. i. is then admitted through the pipe 36 for 33 minutes until the pressure rises along the thin dotted line 48 to 20 pounds. The temperature in the autoclave is caused to continue to rise as indicated by the line 45 until a temperature of 260° F. has been reached at the end of the first hour. Such pressure and temperature is then held until the boots 10 have been in the autoclave 28 for two hours and fifty minutes. The steam valve 31 is then closed, and cold water is admitted by the valve 43 to the spray pipe 41, which sprays the boots 10 with water for a period of 15 minutes. During the first 8 minutes of spray, the temperature within the autoclave 28 drops to 250° F. and then drops more rapidly for the next 7 minutes to 150° F.

It will be noted that in respect to time, the increase of pressure in the autoclave at the beginning of the curing cycle and the decrease in pressure at the end of the curing cycle lags behind the increase and decrease in the temperature at the beginning and end of the cycle respectively. Because the temperature of the boot lags behind the rising and falling temperatures within the autoclave 28, the above mentioned lag in the pressure in the autoclave is necessary in order to maintain the pressure of the autoclave equal to the internal pressure of the cellular material 14 in the boot 10 so that the boot will be heated and cooled without any substantial change in the volume of the cellular material. Therefore when the autoclave is operated in accordance wtih the pressure temperature time chart shown in Fig. 4, the cellular material will be maintained at a constant volume during the heating and cooling cycles.

It will be understood that wherever the term rubber is used herein it means pliable rubbery organic plastic suitable for making waterproof footwear, such for example as natural and/or synthetic rubber compositions or mixtures of such rubber compositions and other compatible organic plastics. It is also to be understood that the pressures used in reference to the autoclave are gauged pressures per square inch and that the temperatures are Fahrenheit.

Referring to Fig. 2, after the boot 10 has been cured and removed from the autoclave, the bridging piece 25 is slit downwardly along its center line 49 and the inner lining 12 is slit downwardly along the rubber coated fabric 22 opposite to the U-turn 50 therein at each side of the insulated portion of the insulated tongue 21, to permit the removal of the boot 10 from the last 11, and also to permit the built-in bellows tongue 21 to expand and provide space for the entry of the foot into the boot. Eyelets are then affixed to the eyelet stays 26 to provide means for lacing the boot.

While the preferred method of making insulated footwear has been described herein, it will be understood that changes may be made in the details thereof without departing from the spirit of this invention or the scope of the appended claims, and it is intended to protect such changes.

Having thus described our invention, what we claim and desire to protect by Letters Patent is:

1. The method of making heat insulated waterproof footwear comprising the steps of applying a lining layer of uncured rubber composition to a footwear building last, assembling an insulating layer of soft flexible preblown closed cell cellular rubber over said lining layer, applying an outer protective waterproof layer of tacky uncured rubber composition over said insulating layer to form a built-up article of footwear, placing the built-up footwear in a closed chamber containing a fluid medium, heating said footwear above 200° F. to cure said uncured layers, cooling said built-up footwear to a temperature below 150° F. in said closed chamber, and maintaining said cellular rubber at a substantially constant volume by maintaining the pressure of said fluid medium substantially equal to the internal pressure of said cellular rubber during the heat cure and cooling steps.

2. The method of making insulated waterproof footwear comprising the steps of applying a vulcanizable layer of rubber to a last to form a waterproof lining for said footwear, assembling an insulating layer of pre-blown closed cell cellular rubber over said lining layer, applying an outer protective waterproof layer of vulcanizable rubber over said insulating layer to form a built-up article of footwear, placing said built-up footwear in a closed chamber containing a gaseous atmosphere, heating said lining and protective layers to thereby vulcanize same and then cooling said footwear in said chamber, maintaining said cellular rubber at a substantially constant volume during the said heating and cooling periods by maintaining the pressure of said gaseous atmosphere within said chamber substantially equal to the interior pressure within said cellular rubber.

3. The method of making heat insulated waterproof footwear comprising the steps of assembling an insulating layer of pre-blown closed cell cellular rubber on a rigid footwear building last to cover the portions of the footwear desired to be insulated, applying a waterproof protective layer of vulcanizable rubber composition over said insulating layer and last, heating said footwear parts in a fluid medium to a temperature sufficient to increase the internal pressure of said cellular rubber until said vulcanizable rubber compound has been vulcanized, cooling said footwear in said fluid medium until the internal pressure of said cellular rubber has been reduced substantially to its normal pressure, and maintaining said cellular rubber at a substantially constant volume during the heating and cooling periods by varying the pressure of the surrounding fluid medium to maintain it substantially equal to the pressure within the cells of said cellular rubber during said periods.

4. The method of making heat insulated waterproof footwear comprising the steps of assembling an insulating layer of pre-blown soft flexible closed cell cellular rubber on an unyieldable footwear building last, applying a tacky waterproof protective layer of vulcanizable rubber composition over said insulating layer and last, heating said layer of vulcanizable rubber composition in a fluid medium at a temperature above 150° F. and thereby vulcanizing and bonding said protective layer to said cellular layer, cooling said footwear in said fluid medium until the internal pressure of said cellular rubber layer has been reduced substantially to its normal pressure, and maintaining said cellular rubber at a substantially constant volume during the heating and cooling periods by varying the pressure of the surrounding fluid medium to maintain it substantially equal to the interior pressure of said cellular rubber.

5. The method of making heat insulated waterproof footwear comprising the steps of applying an inner lining of vulcanizable rubber to a footwear building last, assembling an insulating layer of pre-blown closed cell cellular rubber over said lining in portions desired to be insulated, applying an outer protective layer of waterproof vulcanizable rubber compound over said insulating layer and last to form a built-up article of footwear, placing the built-up footwear in a closed chamber containing a fluid medium, heat curing said vulcanizable rubber layers at a temperature above 150° F., cooling said footwear in said chamber to a temperature below 150° F., and maintaining said cellular rubber at a substantially constant volume by varying the pressure of said fluid medium in said chamber to maintain it substantially equal to the internal pressure of said cellular rubber during the heat cure and cooling steps.

6. The method of making heat insulated waterproof footwear comprising the steps of assembling an insulating layer of pre-blown soft flexible closed cell cellular rubber on a rigid footwear building last, applying a protective outer shell of vulcanizable rubber composition over said insulating layer, placing said footwear in a chamber containing air, heating the interior of said chamber to a temperature above 150° F., maintaining said temperature until said shell has been vulcanized, cooling said footwear by spraying water onto it until the temperature of said footwear has been reduced below 150° F., and maintaining said cellular rubber at a substantially constant volume during the heating and cooling periods by varying the pressure of the surrounding air to maintain it substantially equal to the pressure within the cells of said cellular rubber during said periods.

References Cited in the file of this patent

UNITED STATES PATENTS

| | | |
|---|---|---|
| 1,177,678 | Bierer | Apr. 4, 1916 |
| 1,665,312 | Laursen | Apr. 10, 1928 |
| 1,862,025 | Leguillon | June 7, 1932 |
| 1,871,083 | Randall | Aug. 9, 1932 |